(12) United States Patent
Sundaravel Damotharan et al.

(10) Patent No.: US 12,392,270 B2
(45) Date of Patent: Aug. 19, 2025

(54) SYSTEMS AND METHODS FOR EXHAUST AFTERTREATMENT SENSOR OFFSET DETECTION AND DIAGNOSIS

(71) Applicant: Cummins Inc., Columbus, IN (US)

(72) Inventors: Arun Shori Sundaravel Damotharan, Columbus, IN (US); Rutika Kaustubh Gokhale, Columbus, IN (US); Rakesh Mohanty, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/281,064

(22) PCT Filed: Mar. 10, 2022

(86) PCT No.: PCT/US2022/019836
§ 371 (c)(1),
(2) Date: Sep. 8, 2023

(87) PCT Pub. No.: WO2022/192595
PCT Pub. Date: Sep. 15, 2022

(65) Prior Publication Data
US 2024/0295185 A1    Sep. 5, 2024

Related U.S. Application Data

(60) Provisional application No. 63/159,598, filed on Mar. 11, 2021.

(51) Int. Cl.
| *F01N 11/00* | (2006.01) |
| *F01N 3/20* | (2006.01) |
| *G01M 15/10* | (2006.01) |

(52) U.S. Cl.
CPC ............ *F01N 11/002* (2013.01); *F01N 3/208* (2013.01); *G01M 15/102* (2013.01); *F01N 2550/02* (2013.01); *F01N 2900/1602* (2013.01)

(58) Field of Classification Search
CPC .... F01N 11/002; F01N 3/208; F01N 2550/02; F01N 2900/1602; F01N 3/2066;
(Continued)

(56) References Cited

U.S. PATENT DOCUMENTS 9,606,092 B2    3/2017   Brahma
9,784,166 B2    10/2017  Osburn et al.
(Continued)

FOREIGN PATENT DOCUMENTS

WO    WO-2018/013038 A1    1/2018

OTHER PUBLICATIONS

PCT International Search Report and Written Opinion for International Application No. PCT/US2022/019836 mailing date Jun. 9, 2022, 7 pages.
(Continued)

*Primary Examiner* — Brandon D Lee
(74) *Attorney, Agent, or Firm* — Foley & Lardner LLP (57) ABSTRACT

Systems and methods for diagnosing a sensor of an exhaust aftertreatment system can include a controller determining that an amount of an exhaust gas constituent at a particular location is expected to be at or below a predefined value for a period of time, and receiving data indicative of a sensed amount of the exhaust gas constituent from the sensor of the exhaust aftertreatment system during the period of time. The controller determines, based on the sensed amount of the exhaust gas constituent, an amount of offset affecting the sensor of the exhaust aftertreatment system, and initiates an action based on the determined amount of offset to diagnose the sensor.

20 Claims, 3 Drawing Sheets

(58) Field of Classification Search
CPC ........... F01N 2560/02; F01N 2560/026; F01N 2560/06; F01N 2570/14; F01N 11/00; G01M 15/102; Y02T 10/12
See application file for complete search history.

(56) References Cited

U.S. PATENT DOCUMENTS

| | | |
|---|---|---|
| 2010/0180576 A1 | 7/2010 | Wang et al. |
| 2011/0202230 A1 | 8/2011 | Sawada et al. |
| 2012/0303206 A1 | 11/2012 | Rajagopalan et al. |
| 2014/0360166 A1* | 12/2014 | Chandrasekaran ... F02D 41/222 60/274 |
| 2015/0033704 A1* | 2/2015 | Ardanese ................ F01N 9/005 60/274 |
| 2015/0176512 A1* | 6/2015 | Smith ................ F02D 41/0235 60/274 |
| 2016/0041137 A1 | 2/2016 | Brahma |
| 2018/0283248 A1* | 10/2018 | Upadhyay ........... F02D 41/1446 |
| 2020/0063633 A1 | 2/2020 | Lauritano et al. |
| 2021/0148266 A1* | 5/2021 | Kim ........................ F01N 3/208 |
| 2021/0293172 A1* | 9/2021 | Lundström ............. F01N 3/208 |

OTHER PUBLICATIONS

Extended Search Report for corresponding EP Patent Application No. 22768024.6, issued Dec. 2, 2024, 9 pages.

* cited by examiner

SYSTEMS AND METHODS FOR EXHAUST AFTERTREATMENT SENSOR OFFSET DETECTION AND DIAGNOSIS

CROSS-REFERENCE TO RELATED APPLICATION

This application claims priority to and the benefit of U.S. Provisional Application No. 63/159,598 filed on Mar. 11, 2021 and titled "SYSTEMS AND METHODS FOR EXHAUST AFTERTREATMENT SENSOR OFFSET DETECTION AND DIAGNOSIS," which is incorporated by reference herein in its entirety.

TECHNICAL FIELD

The present disclosure relates to diagnosing exhaust aftertreatment systems. More particularly, the present disclosure relates to detection of aftertreatment sensor, and particularly nitrous oxide (NOx) sensor, faults.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set emission standards to which engines must comply. Consequently, the use of exhaust aftertreatment systems on engines to reduce emissions is increasing. Exhaust aftertreatment systems are generally designed to reduce emission of particulate matter, nitrogen oxides, hydrocarbons, and other environmentally harmful pollutants.

SUMMARY

One embodiment relates to a method for diagnosing a sensor of an exhaust aftertreatment system that includes determining, by a controller, that an amount of an exhaust gas constituent at a particular location is expected to be at or below a predefined value for a period of time; receiving, by the controller, data indicative of a sensed amount of the exhaust gas constituent from the sensor of the exhaust aftertreatment system during the period of time; determining, by the controller and based on the sensed amount of the exhaust gas constituent, an amount of offset affecting the sensor of the exhaust aftertreatment system; and initiating, by the controller, an action based on the determined amount of offset to diagnose the sensor.

Another embodiment relates to a system for diagnosing a sensor of an exhaust aftertreatment system. The system includes a controller comprising a processor coupled to a memory storing executable instructions, the executable instructions when executed by the processor cause the processor to: determine that an amount of an exhaust gas constituent at a particular location is expected to be at or below a predefined value for a period of time; receive data indicative of a sensed amount of the exhaust gas constituent from the sensor of the exhaust aftertreatment system during the period of time; determine, based on the sensed amount of the exhaust gas constituent, an amount of offset affecting the sensor of the exhaust aftertreatment system; and initiate an action based on the determined amount of offset to diagnose the sensor.

Still another embodiment relates to a non-transitory computer-readable medium comprising executable instructions that, when executed by a processor, cause the processor to: determine that an amount of an exhaust gas constituent at a particular location is expected to be at or below a predefined value for a period of time; receive data indicative of a sensed amount of the exhaust gas constituent from a sensor of the exhaust aftertreatment system during the period of time; determine, based on the sensed amount of the exhaust gas constituent, an amount of offset affecting the sensor of the exhaust aftertreatment system; and initiate an action based on the determined amount of offset to diagnose the sensor.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

DETAILED DESCRIPTION

Following below are more detailed descriptions of various concepts related to, and implementations of, methods, apparatuses, and systems for diagnosing an exhaust aftertreatment sensor, and particularly, a tailpipe NOx sensor based on periods of expected zero or close to zero NOx output. Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As environmental regulations become more stringent, consistent aftertreatment system performance is important to keep vehicle emissions within compliance. Consistent aftertreatment system performance is dependent on components of the aftertreatment system functioning correctly, so detecting when aftertreatment system components are malfunctioning (or functioning outside of acceptable bounds) may be an important function. One such aftertreatment system component is the Selective Catalytic Reduction (SCR) system, which converts nitrous oxides (NOx) in the exhaust stream into less harmful nitrogen and water. SCR health can be determined based on a conversion efficiency, which refers to how efficiently the SCR is converting NOx into less harmful elements. One way to determine SCR conversion efficiency is to compare a SCR NOx inlet value to a SCR NOx outlet value. As such, SCR conversion efficiency determinations may rely on sensed values from one or more NOx sensors. Therefore, determining whether the SCR system is functioning properly may be dependent on the health/operation capability of the NOx sensor.

Sensors are inherently affected by offset and/or gain. Offset refers to a flat value that the sensed value is off from the actual value (e.g., an offset of 10° C. means that an actual temperature of 60° C. would be read as 70° C.), while gain refers to a percentage amount that the sensed value is off from the actual value (e.g., a gain of 10% or 1.1 means that an actual temperature of 60° C. would be read as 66° C.). Because offset and gain are generally unavoidable for sensors, some amount of offset and/or gain is allowed to be present without an error flag being raised for the sensor at-issue. Although reference is made throughout to determining an amount of offset affecting a system-out NOx sensor, the systems and methods described herein should be read as applicable to either offset or gain and as applicable to any aftertreatment system sensor (e.g., engine-out NOx sensor, flow sensor, temperature sensor, etc.) Furthermore, while reference is made throughout to use of Celsius for measuring temperatures, the systems and methods described herein should be read as applicable to measuring temperature in Fahrenheit.

Figure 1:
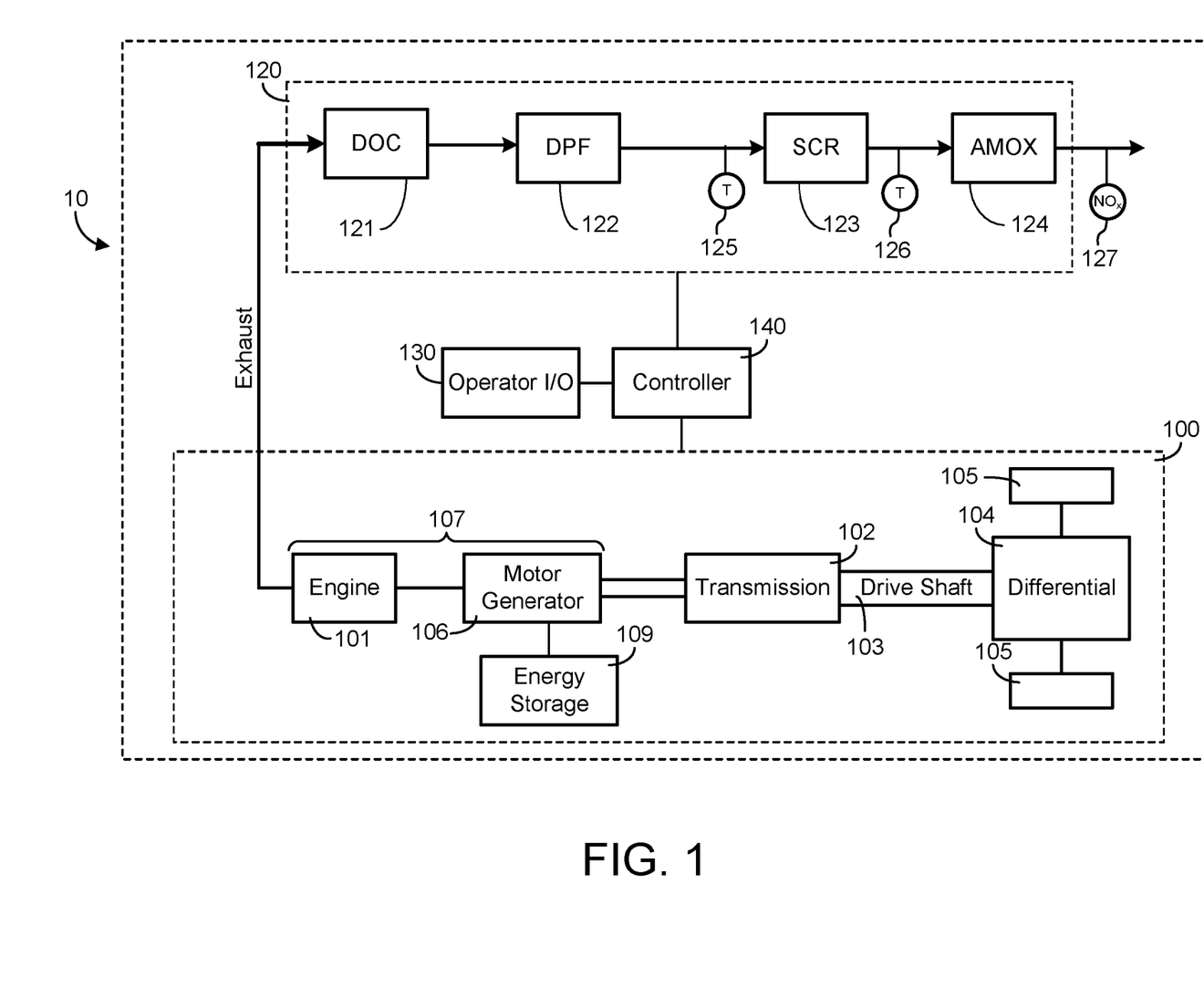
FIG. 1 is a schematic diagram of a hybrid series vehicle system, according to an exemplary embodiment.

Referring now to FIG. 1, a vehicle 10 including a powertrain 100, an aftertreatment system 120, an operator input/output (I/O) device 130, and a controller 140 is shown, according to an example embodiment. According to the example embodiment shown in FIG. 1, the powertrain 100 of the vehicle 10 is structured as a series hybrid powertrain. However, in other embodiments, the powertrain 100 is structured as an internal combustion-only powertrain (i.e., a non-hybrid vehicle applications). The vehicle 10 may be an on-road or an off-road vehicle including, but not limited to, line-haul trucks, mid-range trucks (e.g., pick-up truck), cars (e.g., sedans, hatchbacks, coupes, etc.), buses, vans, refuse vehicles, fire trucks, concrete trucks, delivery trucks, and any other type of vehicle. In other embodiments, the system or parts thereof described herein may be used with stationary applications, such as power generators. Thus, the present disclosure is applicable with a wide variety of implementations.

As shown in FIG. 1, the powertrain 100 includes an engine 101, a transmission 102, a driveshaft 103, a differential 104, a final drive 105, a motor-generator 106, and an energy storage device 109. The engine 101 may be structured as any engine type, including a spark-ignition internal combustion engine, a compression-ignition internal combustion engine, and/or a fuel cell, among other alternatives. The engine 101 may be any type of engine that generates exhaust gas (e.g., compression ignition or a spark ignition engine that may utilize various fuels, such as natural gas, gasoline, diesel fuel, jet fuel, etc.). The engine 101 includes one or more cylinders and associated pistons. In this regard, air from the atmosphere is combined with fuel, and combusted, to power the engine 101. In the example shown, the engine 101 is structured as a compression-ignition engine that utilizes diesel fuel. Combustion of the fuel and air in combustion chambers of the engine 101 produces exhaust gas that is operatively vented to an exhaust pipe and to the aftertreatment system 120. In the example shown, the engine 101 is structured as an internal combustion engine and particularly, a compression-ignition engine powered by diesel fuel.

The transmission 102 may be structured as any type of transmission, such as a continuous variable transmission, a manual transmission, an automatic transmission, an automatic-manual transmission, a dual clutch transmission, and so on. Accordingly, as transmissions vary from geared to continuous configurations (e.g., continuous variable transmission), the transmission 102 may include a variety of settings (gears, for a geared transmission) that affect different output speeds based on an input speed received thereby (e.g., from the motor generator 106, etc.). Like the engine 101 and the transmission 102, the driveshaft 103, the differential 104, and the final drive 105 may be structured in any configuration dependent on the application (e.g., the final drive 105 is structured as wheels in an automotive application and a propeller in a boat application, etc.). Further, the driveshaft 103 may be structured as any type of driveshaft including, but not limited to, a one-piece, two-piece, and a slip-in-tube driveshaft based on the application.

In the series hybrid configuration depicted, the engine 101 and the motor generator 106 are mechanically coupled together (e.g., via a shaft, a gear box, etc.). In other embodiments, a parallel hybrid configuration may be utilized. In a parallel configuration, the engine 101 and motor generator 106 can provide power simultaneously to drive the vehicle. In the depicted series configuration, the drivetrain receives power from the motor generator 106, which may be powered by the engine 101 or energy storage device 109. Thus, in some embodiments, the engine 101 is structured to drive the motor generator 106 to generate electrical energy. As shown in FIG. 1, the motor generator 106 is electrically coupled to the energy storage device 109 such that the motor generator 106 may provide energy generated thereby to the energy storage device 109 for storage. In some embodiments, the motor generator 106 is structured to receive stored electrical energy from the energy storage device 109 to facilitate operation thereof. By way of example, the motor generator 106 may receive stored electrical energy from the energy storage device 109 to facilitate starting the engine 101 and/or driving the motor aspect of the motor generator 106. In other embodiments, the motor generator 106 and energy storage device 109 are omitted, such that the vehicle 10 and powertrain 100 are powered only by the engine 101.

As shown in FIG. 1, in series hybrid configurations, the motor generator 106 is mechanically coupled to the transmission 102 (e.g., via a shaft, a gear box, etc.). In an alternative embodiment (e.g., a stationary application, such as a genset), the powertrain 100 does not include the transmission 102 and the motor generator 106 is directly coupled to the driveshaft 103. In some embodiments, the motor generator 106 is a single device having both generating and motoring capabilities. In some embodiments, the motor generator 106 has only motoring capabilities. As shown in FIG. 1, the motor generator 106 is electrically coupled to the energy storage device 109 such that the motor generator 106 may receive energy stored by the energy storage device 109 to facilitate operation thereof. By way of example, the motor generator 106 may receive stored electrical energy from the energy storage device 109 to facilitate providing a mechanical output to the transmission 102. By way of example, the motor generator 106 may be structured to utilize a negative torque supply to perform energy regeneration (e.g., when the torque demand therefrom is zero, during engine braking, while the vehicle 10 is coasting down a hill, etc.).

According to an example embodiment, the energy storage device 109 includes one or more batteries (e.g., high voltage batteries, a lead-acid batteries, a lithium-ion batteries, lithium iron phosphate batteries, etc.), one or more capacitors (e.g., super capacitors, etc.), and/or any other energy storage devices, or combination thereof. As shown in FIG. 1, the energy storage device 109 is electrically coupled to the motor generator 106. According to an example embodiment, the energy storage device 109 is structured to store electrical energy (i) received from a charging station (e.g., a vehicle charging station, etc.), (ii) generated by the motor generator 106, and/or (iii) generated by a regenerative braking system. The energy storage device 109 may be structured to provide the stored electrical energy to (i) vehicle subsystems to operate various electrical based components of the vehicle 10 (e.g., while the engine 101 is running, while the engine 101 is off, etc.), (ii) the motor generator 106 to start the engine 101 (e.g., in response to a restart command after a stop-start feature turns off the engine 101, when an operator keys on the engine 101, etc.), and/or (iii) the motor generator 106 to facilitate providing a mechanical output to the transmission 102 (e.g., to drive the vehicle 20, etc.).

The aftertreatment system 120 is in exhaust-gas receiving communication with the engine 101. In the example shown, the aftertreatment system includes a diesel particulate filter (DPF) 122, a diesel oxidation catalyst (DOC) 121, a selective catalytic reduction (SCR) system 123, and an ammonia oxidation catalyst (AMOX) 124. In other embodiments, certain components or systems may be omitted and/or rearranged in a different order than depicted in FIG. 1 (e.g., the DPF 122 omitted). The DOC 121 is structured to receive the exhaust gas from the engine 12 and to oxidize hydrocarbons and carbon monoxide in the exhaust gas, among its other functions such as NO oxidation to NO2 to promote passive DPF regeneration and fast SCR reaction. The DPF 122 is arranged or positioned downstream of the DOC 121 and structured to remove particulates, such as soot, from exhaust gas flowing in the exhaust gas stream. The DPF 122 includes an inlet, where the exhaust gas is received, and an outlet, where the exhaust gas exits after having particulate matter substantially filtered from the exhaust gas and/or converting the particulate matter into carbon dioxide.

The aftertreatment system 120 may further include a reductant delivery system which may include a decomposition chamber (e.g., decomposition reactor, reactor pipe, decomposition tube, reactor tube, etc.) to convert a reductant into ammonia. The reductant may be, for example, urea, diesel exhaust fluid (DEF), Adblue®, a urea water solution (UWS), an aqueous urea solution (e.g., AUS32, etc.), and other similar fluids. A diesel exhaust fluid (DEF) is added to the exhaust gas stream to aid in the catalytic reduction. The reductant may be injected upstream of the SCR catalyst member by a DEF doser such that the SCR catalyst member receives a mixture of the reductant and exhaust gas. The reductant droplets then undergo the processes of evaporation, thermolysis, and hydrolysis to form gaseous ammonia within the decomposition chamber, the SCR catalyst member, and/or the exhaust gas conduit system, which leaves the aftertreatment system 120. The aftertreatment system 120 may further include an oxidation catalyst (e.g. the DOC 121) fluidly coupled to the exhaust gas conduit system to oxidize hydrocarbons and carbon monoxide in the exhaust gas. In order to properly assist in this reduction, the DOC 121 may be required to be at a certain operating temperature. In some embodiments, this certain operating temperature is approximately between 200-500° C. In other embodiments, the certain operating temperature is the temperature at which the HC conversion efficiency of the DOC 121 exceeds a predefined threshold (e.g. the conversion of HC to less harmful compounds, which is known as the HC conversion efficiency).

The SCR 123 is configured to assist in the reduction of NOx emissions by accelerating a NOx reduction process between the DEF and the NOx of the exhaust gas into diatomic nitrogen, water, and/or carbon dioxide. If the SCR catalyst member is not at or above a certain temperature or within a certain temperature range, the acceleration of the NOx reduction process is limited and the SCR 123 may not be operating at a necessary level of efficiency to meet regulations. In some embodiments, this certain temperature is approximately 250-300° C. The SCR catalyst member may be made from a combination of an inactive material and an active catalyst, such that the inactive material, (e.g. ceramic metal) directs the exhaust gas towards the active catalyst, which is any sort of material suitable for catalytic reduction (e.g. base metals oxides like vanadium, molybdenum, tungsten, etc. or noble metals like platinum). In some embodiments, the AMOX 124 is included and structured to address ammonia slip by removing excess ammonia from the treated exhaust gas before the treated exhaust is released into the atmosphere.

Because the aftertreatment system 120 treats the exhaust gas before the exhaust gas is released into the atmosphere, some of the particulate matter or chemicals that are treated or removed from the exhaust gas may build up in the aftertreatment system over time. For example, the soot filtered out from the exhaust gas by the DPF 122 may build up on the DPF 122 over time. Similarly, sulfur particles present in fuel may accumulate in the SCR 123 and deteriorate the effectiveness of the SCR catalyst member. Further, DEF that undergoes incomplete thermolysis upstream of the catalyst may build up and form deposits on downstream components of the aftertreatment system 120. However, these build-ups on (and subsequent deterioration of effectiveness of) these components of the aftertreatment system 120 may be reversible. In other words, the soot, sulfur, and DEF deposits may be substantially removed from the DPF 122 and the SCR 123 by increasing a temperature of the exhaust gas running through the aftertreatment system to recover performance (e.g. for the SCR, conversion efficiency of NOx to $N_2$ and other compounds). These removal processes are referred to as regeneration events and may be performed for the DPF 122, SCR 123, or another component in the aftertreatment system 120 on which deposits develop. However, exposure to high temperatures during active regenerations degrades the DOC, DPF, and SCR catalysts. An active regeneration event is specifically commanded, such as a flow rate measurement through a DPF being below a predefined threshold indicating a partially blocked DPF which, in turn, causes the controller to command a regeneration event where exhaust gas temperatures are elevated in order to raise the temperature of the DPF and burn off the accumulated PM and other components (e.g., raise engine power output, post-injection, and other means to increase exhaust gas temperatures to cause a regeneration event). In contrast, a passive regeneration event occurs naturally during operation of the vehicle (e.g., a high load condition that may be experience while traversing a hill causes an increase in exhaust gas temperatures and regeneration event occurs naturally—not specifically commanded).

Referring still to FIG. 1, an operator input/output (I/O) device 130 is also shown. The operator I/O device 130 may be communicably coupled to the controller 140, such that information may be exchanged between the controller 140 and the I/O device 130, wherein the information may relate to one or more components of FIG. 1 or determinations (described below) of the controller 140. The operator I/O device 130 enables an operator of the vehicle 100 to communicate with the controller 140 and one or more components of the vehicle 100 of FIG. 1. For example, the operator input/output device 130 may include, but is not limited to, an interactive display, a touchscreen device, one or more buttons and switches, voice command receivers, etc.

Figure 2:
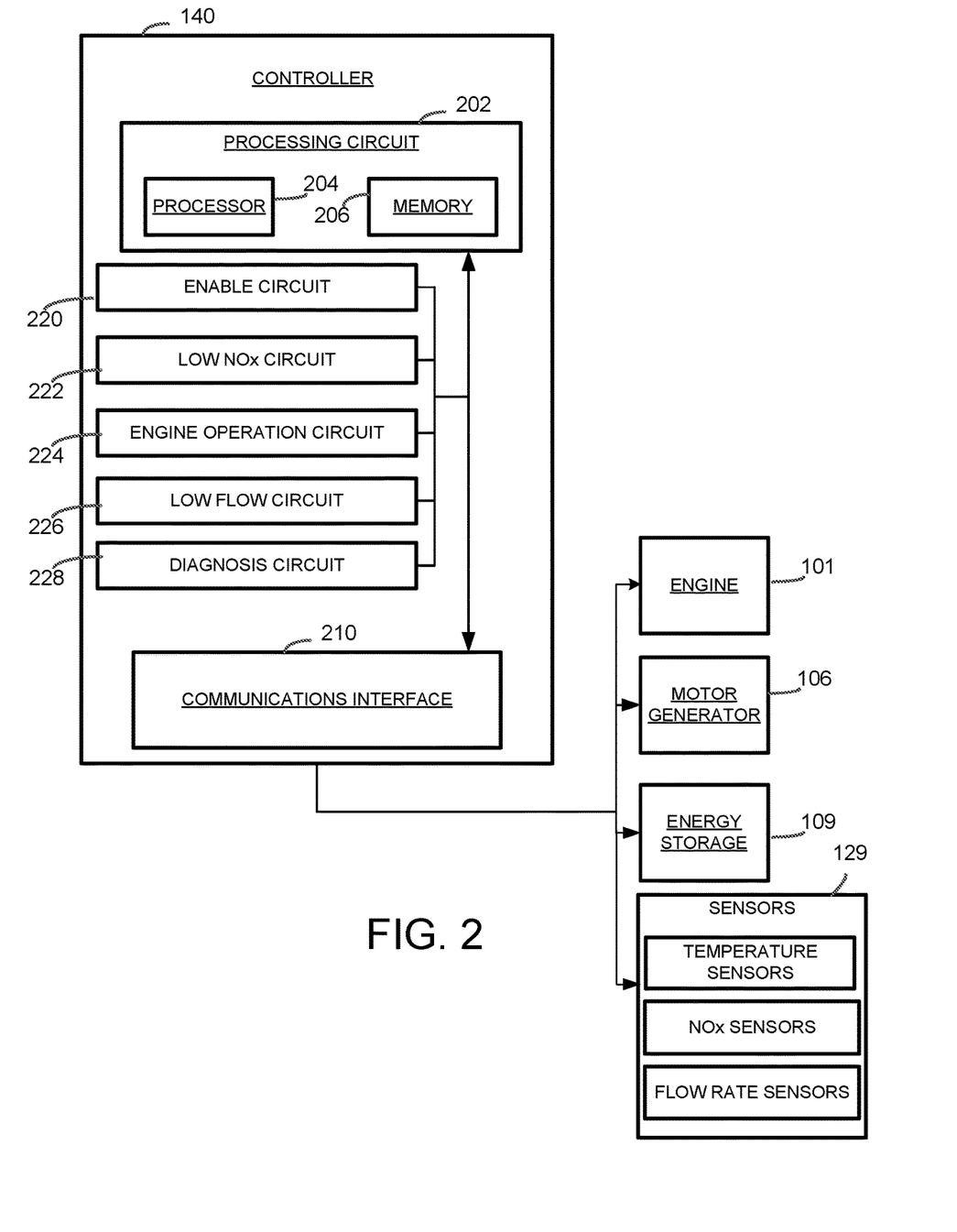
FIG. 2 is a schematic diagram of the controller of FIG. 1, according to an exemplary embodiment.

Briefly referencing FIG. 2, as also shown, a sensor array 129 is included in the aftertreatment system 120. The sensors are coupled to the controller 140, such that the controller 140 can monitor and acquire data indicative of operation of the vehicle 10. In this regard, the sensor array includes at least an inlet temperature sensor 125, an outlet temperature sensor 126, and a tailpipe (or system-out) NOx sensor 127. The inlet temperature sensor 125 is positioned in the exhaust flow upstream of the SCR 123, and acquires data indicative of a temperature at or approximately at its disposed location. The outlet temperature sensor 126 is positioned in the exhaust flow downstream of the SCR 123, and acquires data indicative of a temperature at or approximately at its disposed location. The tailpipe NOx sensor 127 is positioned in the exhaust flow downstream of the aftertreatment system 120, and acquires data indicative of a NOx amount at or approximately at its disposed location. It should be understood that the depicted locations, numbers, and type of sensors is illustrative only. In other embodiments, different/additional sensors may also be included with the vehicle 10 (e.g., an engine-out NOx sensor, a pressure sensor, a flow rate sensor, a temperature sensor, etc.). Those of ordinary skill in the art will appreciate and recognize the high configurability of the sensors in the vehicle 10.

As the components of FIG. 1 are shown to be embodied in the vehicle 10, the controller 140 may be structured as one or more electronic control units (ECU). For example, the controller 140 may be included with or separate from an engine control unit, an aftertreatment system control unit, a transmission control unit, or another ECU included with the vehicle 10. The function and structure of the controller 140 is described in greater detail in FIG. 2.

Referring now to FIG. 2, a schematic diagram of the controller 140 of the vehicle 10 of FIG. 1 is shown, according to an example embodiment. As shown in FIG. 2, the controller 140 includes a processing circuit 202 having a processor 204 and a memory 206, an enable circuit 220, a low NOx circuit 222, an engine operation circuit 224, a low flow circuit 226, a diagnosis circuit 228, and a communications interface 210. Generally, the controller 140 is structured to determine that a condition is present for an amount of system-out NOx (SONOx) to be at or below a predefined threshold (in one embodiment, the SONOx threshold is approximately 7 ppm of NOx), determine that the low NOx condition persists for a certain period of time, and sample sensed SONOx values during the certain period of time. The controller 140 then filters the sensed SONOx values, compares a minimum of the filtered values to one or more thresholds, and diagnoses a health of the tailpipe NOx sensor 127 based on the comparison.

In one configuration, the enable circuit 220, the low NOx circuit 222, the engine operation circuit 224, the low flow circuit 226, and the diagnosis circuit 228 are embodied as machine or computer-readable media storing instructions that are executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media instructions may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the enable circuit 220, the low NOx circuit 222, the engine operation circuit 224, the low flow circuit 226, and the diagnosis circuit 228 are embodied as hardware units, such as electronic control units. As such, the enable circuit 220, the low NOx circuit 222, the engine operation circuit 224, the low flow circuit 226, and the diagnosis circuit 228 may be embodied as one or more circuitry components including, but not limited to, processing circuitry, network interfaces, peripheral devices, input devices, output devices, sensors, etc. In some embodiments, the enable circuit 220, the low NOx circuit 222, the engine operation circuit 224, the low flow circuit 226, and the diagnosis circuit 228 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the enable circuit 220, the low NOx circuit 222, the engine operation circuit 224, the low flow circuit 226, and the diagnosis circuit 228 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The enable circuit 220, the low NOx circuit 222, the engine operation circuit 224, the low flow circuit 226, and the diagnosis circuit 228 may also include programmable hardware devices such as field programmable gate arrays, programmable array logic, programmable logic devices or the like. The enable circuit 220, the low NOx circuit 222, the engine operation circuit 224, the low flow circuit 226, and the diagnosis circuit 228 may include one or more memory devices for storing instructions that are executable by the processor(s) of the enable circuit 220, the low NOx circuit 222, the engine operation circuit 224, the low flow circuit 226, and the diagnosis circuit 228. The one or more memory devices and processor(s) may have the same definition as provided below with respect to the memory 206 and processor 204. In some hardware unit configurations, the enable circuit 220, the low NOx circuit 222, the engine operation circuit 224, the low flow circuit 226, and the diagnosis circuit 228 may be geographically dispersed throughout separate locations in the vehicle. Alternatively and as shown, the enable circuit 220, the low NOx circuit 222, the engine operation circuit 224, the low flow circuit 226, and the diagnosis circuit 228 may be embodied in or within a single unit/housing, which is shown as the controller 140.

In the example shown, the controller 140 includes the processing circuit 202 having the processor 204 and the memory 206. The processing circuit 202 may be structured or configured to execute or implement the instructions, commands, and/or control processes described herein with respect to the enable circuit 220, the low NOx circuit 222, the engine operation circuit 224, the low flow circuit 226, and the diagnosis circuit 228. The depicted configuration represents the enable circuit 220, the low NOx circuit 222, the engine operation circuit 224, the low flow circuit 226, and the diagnosis circuit 228 as machine or computer-readable media storing instructions. However, as mentioned above, this illustration is not meant to be limiting as the present disclosure contemplates other embodiments where the enable circuit 220, the low NOx circuit 222, the engine operation circuit 224, the low flow circuit 226, and the diagnosis circuit 228, or at least one circuit of the enable circuit 220, the low NOx circuit 222, the engine operation circuit 224, the low flow circuit 226, and the diagnosis circuit 228, is configured as a hardware unit. All such combinations and variations are intended to fall within the scope of the present disclosure.

The processor 204 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., the enable circuit 220, the low NOx circuit 222, the engine operation circuit 224, the low flow circuit 226, and the diagnosis circuit 228 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory 206 may be communicably connected to the processor 204 to provide computer code or instructions to the processor 204 for executing at least some of the processes described herein. Moreover, the memory 206 may be or include tangible, non-transient volatile memory or non-volatile memory. Accordingly, the memory 206 may include database components, object code components, script components, or any other type of information structure for supporting the various activities and information structures described herein.

The communications interface 210 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 210 may include an Ethernet card and port for sending and receiving data via an Ethernet-based communications network and/or a Wi-Fi transceiver for communicating via a wireless communications network. The communications interface 210 may be structured to communicate via local area networks or wide area networks (e.g., the Internet) and may use a variety of communications protocols (e.g., IP, LON, Bluetooth, ZigBee, radio, cellular, near field communication).

Components of the vehicle 10 may communicate with each other or foreign components using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections. Because the controller 140 is communicably coupled to the systems and components in the vehicle 10, the vehicle controller 140 is structured to acquire operation data and/or OBD capability data regarding one or more of the components or systems shown in FIG. 1. For example, the operation data may include data regarding operating conditions of the powertrain 100 acquired by one or more sensors, such as sensors 130.

Each of the enable circuit 220, the low NOx circuit 222, the engine operation circuit 224, the low flow circuit 226, and the diagnosis circuit 228 are configured to assist in the deduction of sensor offset for the tailpipe NOx sensor 127. Sensor offset is defined as an amount of units (e.g., if the sensor is a temperature sensor acquiring values in the unit 'degrees,' the amount of sensor offset is in the unit 'degrees.') that the sensed value (i.e., the value output by the particular sensor) differs from an actual value. Offset can be either negative (i.e., the sensed value is less than the actual value) or positive (i.e., the sensed value is higher than the actual value). For example, if the sensor offset for a temperature sensor is +10° C. and the sensed value is 250° C., then the actual value is 240° C. Determining the amount of sensor offset may be critical for vehicle 10 operation because failing to account for a difference between sensed values and actual values can negatively affect those vehicle 10 operations that rely on accurate sensed values.

The enable circuit 220 is structured or configured to determine if an enabling condition is satisfied or present prior to running or executing the engine operation circuit 224, the low flow circuit 226, and the diagnosis circuit 228. The enable condition may relate to the health of the vehicle 10 and may include one or more a plurality of conditions that are indicative of a health of the vehicle 10 or components thereof. Healthy components refer to components that are operating as intended (e.g., no presence of fault or error codes, operating parameters are within predefined acceptable ranges, etc.). In operation, the controller 140 does not execute the various circuits if there are outstanding error or fault flags/codes raised for components within the vehicle 10 (i.e., the enable condition indicative of a healthy component is not satisfied). For example, if there are existing faults identified for the tailpipe NOx sensor 127, the enable circuit 220 determines that the enabling condition is not satisfied. In addition, if a particular sensor is determined to be affected by gain by an adverse material amount, the enable circuit 220 determines that the enabling condition is not satisfied.

With particular regard to the aftertreatment system 120, aftertreatment system-specific enabling conditions include a) whether SCR 123 temperature drops more than an amount (e.g., 20-50° C.) from an operating temperature as a significant drop in SCR 123 temperature expands ammonia storage capacity and leads to less (or no) ammonia release to avoid ammonia being falsely read as NOx by the sensors 129; b) whether DEF dosing occurs for at least a certain predefined period of time (e.g., 120-600 s) after a regeneration event, as regeneration events deplete ammonia storage, which is then replenished by this amount of DEF dosing; c) whether DEF dosing has been occurring for a certain predefined period of time regardless of regeneration events (e.g., 60-180 s), which ensures that ammonia storage is available for efficient NOx conversion; and, d) whether a temperature of the SCR 123 is inside of a pre-determined temperature range (e.g., a range of temperatures at which the SCR 123 is efficiently reducing NOx, such as 220-450° C.), as there are inherent inaccuracies of modeling NOx amounts in the exhaust flow with an inefficient SCR. In some embodiments, the enable circuit 220 determines that operations are enabled if at least one of the aforementioned enabling conditions are satisfied. In other embodiments, the enable circuit 220 determines that operations are enabled if more than one enabling condition is satisfied (e.g., all enabling conditions, a majority of the conditions, etc.).

The low NOx circuit 222 is structured or configured to identify times during which the aftertreatment system 120 is expected to be outputting NOx (i.e., an amount of tailpipe or system-out NOx) at or below a predefined threshold (referred to herein as "low NOx periods"). As described herein, the predefined threshold is approximately zero NOx. In other embodiments, the predefined threshold may be less than 7-10 ppm of NOx. In order to identify these low NOx periods, the low NOx circuit 222 determines when entry conditions are met and then when exit conditions are met. The entry conditions refer to characteristics indicative of the aftertreatment system 120 entering a period of substantially zero NOx output, such that when the entry condition thresholds are passed, the low NOx circuit 222 determines that the aftertreatment system 120 is entering a low NOx period. In contrast, the exit conditions refer to characteristics indicative of the aftertreatment system 120 exiting a period of substantially zero NOx output, such that when the exit condition thresholds are passed, the low NOx circuit 222 determines that the aftertreatment system 120 is exiting a low NOx period.

In some embodiments, the entry and exit conditions are based on the inlet (i.e., frontside) and outlet (i.e., backside) temperatures for an SCR 123 catalyst (i.e., brick). Particularly, the entry and exit conditions are defined based on a rate of change (ROC) of temperature of the SCR 123 brick, as a low temperature ROC indicates that the SCR 123 brick has reached a desired operating temperature (i.e., a temperature at which the SCR 123 is efficiently reducing NOx in the exhaust gas) because the SCR 123 brick temperature is no longer changing (e.g., increasing rapidly in order to reach the desired operating temperature). If the SCR 123 brick is at the desired operating temperature, the low NOx circuit 222 assumes that the output from the aftertreatment system is substantially zero NOx because the SCR 123 is efficiently reducing NOx. In contrast, a high temperature ROC across the SCR indicates that the SCR 123 brick is not at a desired operating temperature, as rapid change in SCR 123 brick temperature occurs if there is movement towards a desired operating temperature (e.g., the vehicle 10 was recently started as is warming) or away from the desired operating temperature (e.g., the vehicle 10 is coasting and hot exhaust gas is no longer being output into the aftertreatment system 120). Put simply, if the SCR 123 brick is experiencing a high temperature ROC, the low NOx circuit 222 determines that the SCR 123 brick is not at the desired operating temperature.

For the SCR 123 brick, the low NOx circuit 222 determines a temperature at or near the frontside of the SCR 123 brick and a temperature at the backside of the SCR 123 brick based on a temperature at the inlet of the SCR 123 (from the inlet temperature sensor 125) and at the outlet of the SCR 123 (from the outlet temperature sensor 126). In some embodiments, the temperatures of the frontside and the backside of the SCR 123 brick are based on a weighted average of the inlet temperature and the outlet temperature, where the inlet temperature is multiplied by a first weight factor, the outlet temperature is multiplied by a second weight factor, and the products are summed. For determining a frontside SCR 123 brick temperature, the low NOx circuit 222 applies a first weight factor of 0.8 and a second weight factor of 0.2, such that more weight is given to the inlet SCR 123 temperature. For determining a backside SCR 123 brick temperature, the low NOx circuit 222 applies a first weight factor of 0.2 and a second weight factor of 0.8, such that more weight is given to the outlet SCR 123 temperature.

Once the low NOx circuit 222 determines the frontside and backside temperatures for the SCR 123 brick, the low NOx circuit 222 determines a ROC for each of the frontside and backside temperatures over a pre-defined period of time. In one embodiment, the period of time is 30-120 seconds. By taking ROC samples over a period of time rather than an instantaneous ROC, the low NOx circuit 222 filters out noise inherent in ROC determinations. Once the frontside and backside ROC have been time-filtered, the filtered frontside ROC value and the filtered backside ROC value are each compared to a pre-defined entry threshold (e.g., −0.2° C./second). If both ROC values are lower than their respective entry thresholds, the low NOx circuit 222 determines that entry conditions are satisfied and that the aftertreatment system 120 is expected to be outputting substantially zero NOx. However, if either ROC value is greater than a pre-defined exit threshold (e.g., 0.1° C./second for 30 seconds), the low NOx circuit 222 determines that exit conditions are satisfied and that the aftertreatment system 120 is no longer expected to be outputting substantially zero NOx. As such, the low NOx circuit 222 determines that the vehicle 10 is in a low NOx period if entry conditions are satisfied but that the exit conditions are not satisfied.

Once the enable circuit 220 determines that operations are enabled and the low NOx circuit 222 determines that the vehicle 10 is in a low NOx period, the active flow circuit 224 is structured or configured to monitor operation of the vehicle 10 while the engine 101 is running (i.e. providing power to the motor generator or directly to the final drive 105). As configured, the active flow circuit 224 monitors conditions with regard to the tailpipe NOx sensor 127 in order to assist in determining an amount of offset present for each sensor. While the engine 101 is operating, the active flow circuit 224 monitors operation for one of two conditions: a) the engine-out NOx (EONOx) being less than a threshold (e.g., 20 parts per million (ppm)); and b) the EONOx mass flow rate being less than a threshold (e.g., 0.05 grams/second) while DEF dosing is active. If either of these conditions are met, the active flow circuit 224 begins to take the integral (i.e., cumulatively sums) of the overall exhaust mass flow rate. Once that integrated value exceeds a pre-determined threshold (e.g., 1000 grams), the active flow circuit 224 increments an active flow timer if the NOx sensor reading is stable. The NOx sensor reading is determined to be stable if a virtual engine-out $O_2$ reading ROC is higher than a pre-defined threshold (e.g., −0.5 percent change/second) and if one of the engine power ROC, exhaust pressure ROC, or exhaust flow ROC is below a pre-defined threshold (e.g., 5 horsepower/s, 10 kpa/s, and 5 g/s$^2$ respectively).

Once the active flow timer has ended (e.g., 10-30 seconds), the active flow circuit 224 increments an event timer and sets an active flow event flag based on the event timer in one of two situations. First, if the event timer exceeds a first threshold (e.g., 120-300 s), the active flow circuit 224 sets an active flow event flag regardless of other operating parameters. Second, if the event timer exceeds a second threshold (e.g., 10-120 s) that is lower than the first threshold, the active flow circuit 224 sets the active flow event flag if one of four secondary conditions is met: 1) a temperature spike (e.g., >1° C./second for 30 seconds) in the SCR 123 is detected; 2) the tailpipe NOx sensor 127 is inactive (i.e., a dew-point temperature threshold for sensor activation is not met); 3) an operation cycle, which is defined based on a type of the vehicle 10 (e.g., for a heavy-duty vehicle, the operation cycle is 4 hours), is complete; or 4) the vehicle 10 is keyed-off (i.e., the key, start button, or other ignition means for the vehicle is in an off state and the vehicle is not turned on). Put simply, an active flow event flag counts an instance in which a low NOx period lasted for a certain length of time during a period of active flow. In this embodiment, the second threshold is lower than the first threshold in order for the active flow circuit 224 to be able to make decisions more quickly for short-duty cycles.

Once the enable circuit 220 determines that operations are enabled and the low NOx circuit 222 determines that the vehicle 10 is in a low NOx period, the low flow circuit 226 is structured or configured to monitor operation of the vehicle 10 while the engine 101 is not running (e.g., ignition/propulsion for the engine 101 is turned off, the motor generator 106 is providing all of the power for the powertrain 100, etc.). In particular, the low flow circuit 226 is configured to monitor an exhaust gas flow in the vehicle and particularly a characteristic of the exhaust gas flow in the vehicle. In one embodiment, the low flow circuit 226 monitors how an amount of EONOx tapers to substantially zero (i.e., 'bleeds off') as no new EONOx is generated due to the engine 101 not operating. When the amount of EONOx goes below a pre-defined threshold (e.g., 100 ppm), the low flow circuit 226 starts a bleed-off timer. The length of this bleed-off timer is an estimated time (e.g., 10-120 s) for the SONOx to taper off to substantially zero, and is set as a function of exhaust pressure and ambient pressure. For higher values of exhaust pressure, the bleed-off timer is set as a lower value, due to higher exhaust pressure resulting in shorter bleed-offs because the higher exhaust pressure pushes remaining NOx out of the engine 101 more quickly. In contrast, for higher values of ambient pressure, the bleed-off time is set as a higher value, due to higher ambient pressure resulting in longer bleed-offs because the higher ambient pressure affects the pressure differential, thereby reducing the movement speed of exhaust (and NOx) in the vehicle 10. When the bleed-off timer expires, the low flow circuit 226 increments a low flow timer if the NOx sensor reading is stable. The NOx sensor reading is determined to be stable if a virtual engine-out O2 reading ROC is less than a pre-defined threshold (e.g., −0.5 percent change/second) and if one of the engine power ROC, exhaust pressure ROC, or exhaust flow ROC is below a pre-defined threshold (e.g., 5 horsepower/s, 10 kpa/s, and 5 g/s2 respectively).

Once the low flow timer has ended (e.g., 10-30 seconds), the low flow circuit 226 increments an event timer and sets a low flow event flag based on the event timer in one of two situations. First, if the event timer exceeds a first threshold (e.g., 120-300 seconds), the low flow circuit 226 sets a low flow event flag regardless of other operating parameters. Second, if the event timer exceeds a second threshold (e.g., 10-120 seconds) that is lower than the first threshold, the low flow circuit 226 sets the low flow event flag if one of four secondary conditions is met: 1) a temperature spike (e.g., >1° C./second for 30 s) in the SCR 123 is detected; 2) the tailpipe NOx sensor 127 is inactive (i.e., a dew-point temperature threshold for sensor activation is not met); 3) an operation cycle, which is defined based on a type of the vehicle 10 (e.g., for a heavy-duty vehicle, the operation cycle is 4 hours), is complete; or 4) the vehicle 10 is keyed-off (as defined above). Put simply, a low flow event flag counts an instance in which a low NOx period lasted for a certain length of time during a period of low flow. In this embodiment, the second threshold is lower than the first threshold in order for the low flow circuit 226 to be able to make decisions more quickly for short-duty cycles.

The diagnosis circuit 228 is structured or configured to receive event flag information from the active flow circuit 224 and low flow circuit 226, apply decision logic based on the event flags, filter the logic output values, and set or clear sensor failure indications based on the filtered output. First, the diagnosis circuit 228 increments an event counter based on each event flag (i.e., active flow flag and low flow flag) received from the active flow circuit 224 and low flow circuit 226. As such, the event counter tracks the number of instances that the vehicle 10 is experiencing a low NOx period of a certain length of time in both active flow (i.e., engine 101 operating) and low flow (i.e., engine 101 off).

The diagnosis circuit 228 determines that a decision update is due (i.e., enough time and enough low NOx periods have occurred that a determination of tailpipe NOx sensor 127 status is due). The diagnosis circuit 228 makes this determination in one of two situations. First, if the total number of events flags exceeds a first threshold (e.g., 2 or 4), the diagnosis circuit 228 determines that a decision update is due. Second, if the total number of event flags exceeds a second threshold (e.g., 1 or 2) that is lower than the first threshold, the diagnosis circuit 228 determines that a decision update is due if one of three secondary conditions is satisfied: 1) the vehicle 10 is keyed-off; 2) an operation cycle, which is defined based on a type of the vehicle 10 (e.g., for a heavy-duty vehicle, the operation cycle is 4 hours), is complete; and 3) an exponentially weighted moving average (EWMA) fast initial response (FIR) or step change mode is detected. FIR is a user-initiated mode that affects the weighting effect for EWMA calculations that emphasizes most recent values in order to more quickly clear faults. Step change is a separate EWMA mode that emphasizes most recent values in order to more quickly react to changing conditions. In this embodiment, the second threshold is lower than the first threshold in order for the low flow circuit 226 to be able to make decisions more quickly for short-duty cycles. Furthermore, each of the secondary considerations are indicative of either an end of operation (such that a decision to check sensor status as an end-of-day task is logical) or an accelerated decision process (such that a more frequent status checks of the sensor is desired).

If the diagnosis circuit 228 determines that a decision update is due, the diagnosis circuit 228 samples and tracks minimum values of system-out NOx (SONOx) from the tailpipe NOx sensor 127. In some embodiments, the diagnosis circuit 228 only samples and tracks SONOx values when the NOx sensor reading is determined to be stable. The NOx sensor reading is determined to be stable if a virtual engine-out $O_2$ reading ROC is higher than a pre-defined threshold (e.g., −0.5 percent change/second) and if one of the engine power ROC, exhaust pressure ROC, or exhaust flow ROC is below a pre-defined threshold (e.g., 5 horsepower/s, 10 kpa/s, and 5 g/s$^2$ respectively). From there, the diagnosis circuit 228 takes a minimum of the sampled SONOx values from the sampling period and inputs the minimum value into a EWMA filter that improves the usability of a raw dataset and materially transforms an entire dataset down to a single value that is easily useable, that reduces memory storage requirements, and that may improve diagnostic operations for the vehicle. The EWMA filter takes the average of a particular value (e.g., minimum sampled SONOx) from multiple sampling periods (i.e., a moving average), and applies a weighting factor to the most recent values that decreases exponentially as values get less recent. In this way, the most recent values (e.g., values from the last x minutes or hours, or the last x values) receive exponentially more weight in the moving average calculation than less recent values (e.g., values from more than x minutes or hours ago, or the values older than the last x values), smoothing the data set by reducing the impact of noise within the data and emphasizing the most recently-sampled datapoints.

Because these sampled SONOx values are collected while the controller 140 expects the SONOx to be zero (i.e., low NOx periods), if the SONOx values are not zero, that difference is likely due to offset affecting the tailpipe NOx sensor 127. As such, the filtered SONOx value, which is determined by the diagnosis circuit 228 based on these sampled SONOx values from low NOx periods, is essentially a value of an amount of offset affecting the tailpipe NOx sensor 127. This filtered SONOx value can therefore be compared against a first threshold indicative of an unacceptable high offset and a second threshold indicative of an unacceptable low offset. Based on this comparison, the diagnosis circuit 228 sets a tailpipe NOx sensor 127 offset fault flag. Put simply, if the minimum of the filtered SONOx values is above the first threshold (i.e., the offset is unacceptably high) or if the minimum of the filtered SONOx values is below the second threshold (i.e., the offset is unacceptably low or negative), the diagnosis circuit 228 determines that the tailpipe NOx sensor 127 is operating outside of acceptable offset levels. However, if the minimum of the filtered SONOx values is between the first and second thresholds (i.e., neither unacceptably high nor unacceptably low) and if a tailpipe NOx sensor 127 offset fault flag is currently set, the diagnosis circuit 228 clears the fault flag.

In some embodiments, the diagnosis circuit 228 tracks separate fault flags for each of the operating modes (i.e., low flow and active flow). Because low flow event flags and active flow event flags cannot be set at the same time due to the impossibility of the engine 101 simultaneously operating and not operating, when the diagnosis circuit 228 determines that a decision is due based on an accumulation of fault flags, the accumulated fault flags are either all active flow event flags or all low flow event flags. As such, when the diagnosis circuit 228 makes a fault flag determination based on the filtered SONOx value, that decision is associated with either active flow or low flow operation. In these embodiments then, the diagnosis circuit 228 sets/clears an active flow tailpipe NOx sensor 127 offset fault flag and a low flow tailpipe NOx sensor 127 offset fault flag.

In these embodiments with separate fault flags, if the decision from the diagnosis circuit 228 is to clear the tailpipe NOx sensor 127 offset fault flag (i.e., the filtered SONOx value is between the two thresholds), the diagnosis circuit 228 only clears the fault flag if the operation mode for the decision update is the same as the operation mode for the fault flag. For example, if a fault flag is currently an active flow tailpipe NOx sensor 127 offset fault flag and if the decision update is triggered by an accumulation of active flow event flags, the diagnosis circuit 228 may decide to clear the active flow tailpipe NOx sensor 127 fault flag. However, if the fault flag is currently an active flow tailpipe NOx sensor 127 offset fault flag but the decision update is triggered by an accumulation of low flow event flags, the diagnosis circuit 228 cannot clear the active flow tailpipe NOx sensor 127 fault flag, even if the filtered SONOx value is between the thresholds.

In addition to setting a fault flag, the diagnosis circuit 228 may take one or more actions based on the fault flag. In some embodiments, the diagnosis circuit 228 exits closed loop DEF control (i.e., DEF dosing is based on an engine-out NOx sensor and the tailpipe NOx sensor 127) and enters open loop DEF control (i.e., DEF dosing is based entirely on the engine-out NOx sensor). In other embodiments, the diagnosis circuit 228 commands a visual indication (e.g., 'check engine' light, etc.) for the user indicative of the fault flag. In further embodiments, the diagnosis circuit 228 reduces or ceases DEF dosing based on the fault flag because the controller 140 'loses trust' in the system-out NOx sensor 127.

Figure 3:
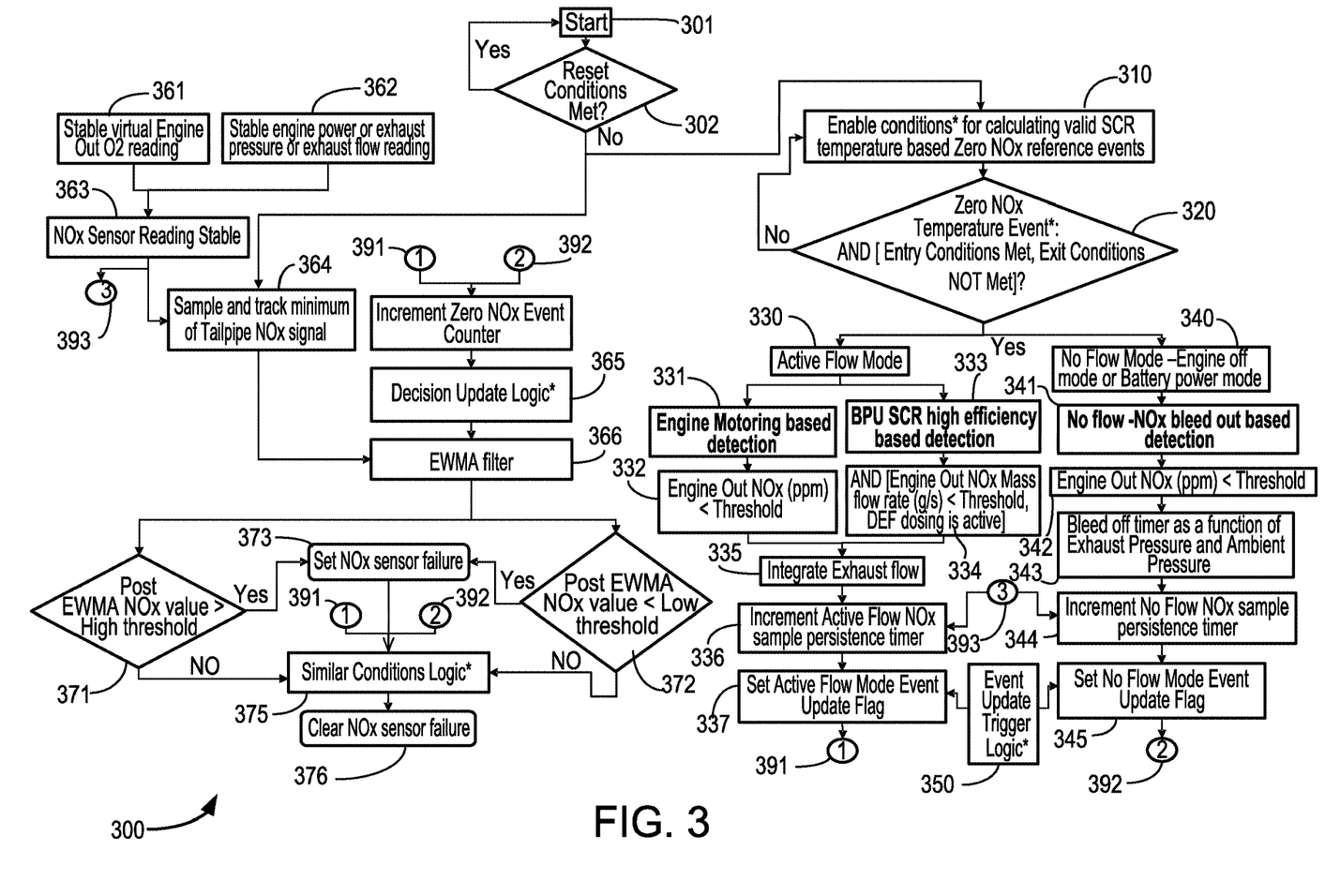
FIG. 3 is a flow chart of a method for determining an amount of offset affecting a sensor and diagnosing the sensor based on the determined amount of offset, according to an exemplary embodiment.

FIG. 3 is a flow chart of a method 300 for determining an amount of offset affecting the tailpipe NOx sensor 127 and diagnosing a status of the tailpipe NOx sensor 127. As shown in FIG. 3, the method 300 begins at process 301. At process 302, the controller 140 determines if reset conditions have been met (e.g., if there are pre-existing fault flags for the vehicle 10, etc.). If the reset conditions are met (302:YES), the method 300 returns to the start at process 301. If the reset conditions are not met (302:NO), the method 300 proceeds to 310 and 364. At 310, the controller 140 determines if enable conditions for determining a valid or accurate SCR 123 temperature are satisfied in order to predict low NOx periods. These enable conditions are discussed herein with regard to the enable circuit 220, such that process 310 is performed by the enable circuit 220. From there, the method 300 proceeds to 320, where the controller 140 determines if the vehicle 10 is expected to be experiencing substantially zero NOx output from the aftertreatment system 120. As described herein, process 320 is performed by the low NOx circuit 222.

If the controller 140 determines that the vehicle 10 is not currently experiencing a low NOx period (320:NO), the method 300 returns to determining enable condition satisfaction at 310. If the controller 140 determines that the vehicle 10 is currently expected to be experiencing zero SONOx (320:YES), the controller 140 proceeds to 330 or 340 depending on engine 101 operation. If the engine 101 is currently operating and exhaust is actively flowing through the aftertreatment system at 330, the controller 140 determines that one of two conditions is satisfied. First, at 331, the controller 140 detects that proper testing conditions are present for engine motoring based on an EONOx value being below a threshold at 332. Second, at 333, the controller 333 determines that proper testing conditions are present for SCR 123 high efficiency based on an EONOx mass flow rate being below a threshold while DEF dosing is active at 334. If either of these two conditions (i.e., either 332 or 334) are satisfied, the controller 140 takes an integral of the exhaust mass flow rate at 335 while either of these two conditions are satisfied. Once the integrated value from 335 exceeds a threshold and NOx sensor readings are determined to be stable from 393 (discussed in more detail below), the controller 140 increments an active flow timer at 336. Once this active flow timer expires, an event timer is incremented for the event update trigger logic at 350, which sets thresholds for the event timer based on other operating parameters. Based on the event update trigger logic, the controller 140 sets an active flow event flag at 337, which is output at 391. As described herein, processes 330-337 are performed by the active flow circuit 224.

If the engine 101 is not currently operating such that no exhaust is being generated at 340, the controller 140 determines that there is NOx "bleed out" (i.e., an amount of NOx in the aftertreatment system 120 is tapering towards substantially zero) at 342 based on the EONOx being below a threshold at 343. From there, the method 300 proceeds to 343, where the controller 140 sets a bleed off timer based on an estimation of how long the remaining NOx in the aftertreatment system 120 will take to reach substantially zero, which is a function of exhaust pressure and ambient pressure. Once the bleed off timer expires, the controller 140 increments a low flow timer at 344 if the NOx sensor readings are determined to be stable from 393. Once this low flow timer expires, an event timer is incremented for the event update trigger logic at 350, which sets thresholds for the event timer based on other operating parameters. Based on the event update trigger logic, the controller 140 sets a low flow event flag at 345, which is output at 392. As described herein, processes 340-345 are performed by the low flow circuit 226.

Before the method 300 samples and tracks minimum SONOx values at 364, the controller 140 determines that the tailpipe NOx sensor 127 readings are stable at 363. This determination is made based on a virtual engine-out $O_2$ reading being stable at 361 and either the engine power, exhaust pressure, or exhaust flow reading (from the sensor array 129) being stable at 362. The determination of stability at 363 is output to 364 and to 393. From there, the sampled minimum SONOx value is fed into a EWMA filter at 366. However, the filtered SONOx value is not output from 366 until the decision update logic from 365 determines that a decision update is due. The decision update logic at 365 takes as inputs the active flow event flags from 391 and the no flow event flags from 392.

Once the filtered SONOx value is output from 366, the value is compared to a high threshold (i.e., a threshold value for offset indicative of unacceptably high offset) at 371 and to a low threshold (i.e., a threshold value for offset indicative of unacceptably low offset) at 372. If the filtered SONOx value is above the high threshold (371:YES) or below the low threshold (372:YES), the method 300 proceeds to 373 where the controller 140 sets a tailpipe NOx sensor 127 fault flag. However, if the filtered SONOx value is below the high threshold (371:NO) and above the low threshold (372:NO), the method proceeds to 375, where the controller 140 applies similar conditions logic to determine if a fault flag should be cleared. As discussed above with regard to the diagnosis circuit 228, in those embodiments in which there are separate fault flags for active flow mode and no flow mode, the controller 140 clears a fault flag only if the fault flag is for the same operation mode as the current decision update. As such, the similar conditions logic at 375 takes as inputs the active fault event flag of 391 and the no flow event flag of 392. If the similar condition logic at 375 indicates that the operation modes are the same, the controller 140 clears the associated tailpipe NOx sensor 127 offset fault flag at 376.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

While various circuits with particular functionality are shown in FIG. 2, it should be understood that the controller 140 may include any number of circuits for completing the functions described herein. For example, the activities and functionalities of the enable circuit 220, the low NOx circuit 222, the engine operation circuit 224, the low flow circuit 226, and the diagnosis circuit 228 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 2. Executable code may, for instance, comprise one or more physical or logical blocks of computer instructions, which may, for instance, be organized as an object, procedure, or function. Nevertheless, the executables need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A method for diagnosing a sensor of an exhaust aftertreatment system, the method comprising:
    receiving, by a controller, a first indication of active exhaust gas flow from an engine to the exhaust aftertreatment system or a second indication of no or low exhaust gas flow to the exhaust aftertreatment system;
    determining, by the controller and in response to the first indication, that an amount of an exhaust gas constituent in the exhaust gas flow at a particular location is expected to be at or below a first predefined value or that an exhaust gas constituent mass flow rate is expected to be at or below a second predefined value for a period of time;
    determining, by the controller and in response to the second indication, that the amount of the exhaust gas constituent at the particular location is expected to be at or below the first predefined value for the period of time;
    receiving, by the controller, data indicative of a sensed amount of the exhaust gas constituent from the sensor of the exhaust aftertreatment system during the period of time;
    determining, by the controller and based on the sensed amount of the exhaust gas constituent, an amount of offset affecting the sensor of the exhaust aftertreatment system; and
    initiating, by the controller, an action based on the determined amount of offset to diagnose the sensor, wherein the action comprises adjusting a reductant dosing based on the offset.

2. The method of claim 1, wherein the exhaust gas constituent is nitrous oxide (NOx).

3. The method of claim 1, wherein the first predefined value is approximately zero parts-per-million.

4. The method of claim 1, wherein the particular location is a system out location and wherein the exhaust gas constituent is NOx.

5. The method of claim 1, wherein the sensor is a system-out NOx sensor.

6. The method of claim 1, wherein determining that the amount of the exhaust gas constituent at the particular location is expected to be at or below the first predefined value for the period of time comprises:
    receiving, by the controller, data indicative of an inlet temperature for a selective catalytic reduction (SCR) of the exhaust aftertreatment system and of an outlet temperature for the SCR;
    determining, by the controller, a frontside temperature and a backside temperature for the SCR based on the inlet temperature and the outlet temperature;
    comparing, by the controller, each of the frontside temperature and the backside temperature to a first threshold and a second threshold; and
    responsive to a determination that both the frontside temperature and the backside temperature are greater than the first threshold and less than the second threshold, determining, by the controller, that the amount of the exhaust gas constituent is expected to be at or below the first predefined value.

7. The method of claim 1, further comprising:
    determining, by the controller, that an enabling condition is satisfied prior to determining that the amount of the exhaust gas constituent is expected to be at or below the first predefined value or that the exhaust gas constituent mass flow rate is expected to be at or below the second predefined value.

8. The method of claim 1, wherein responsive to the determined amount of offset exceeding a predefined high threshold, the action comprises setting a fault indicator for the first indication or the second indication, the fault indicator regarding the sensor.

9. The method of claim 8, wherein responsive to the determined amount of offset being less than a predefined low threshold, the action comprises setting a fault indicator for the first indication or the second indication, the fault indicator regarding the sensor, and wherein responsive to the determined amount of offset falling between the predefined low and high thresholds, the fault indicator for the first indication or the second indication is bypassed.

10. A system for diagnosing a sensor of an exhaust aftertreatment system, the system comprising:
a controller comprising a processor coupled to a memory storing executable instructions, the executable instructions when executed by the processor cause the processor to:
receive a first indication of active exhaust gas flow from an engine to the exhaust aftertreatment system or a second indication of no or low active exhaust gas flow to the exhaust aftertreatment system;
determine, in response to the first indication, that an amount of an exhaust gas constituent in the exhaust gas flow at a particular location is expected to be at or below a first predefined value or that an exhaust gas constituent mass flow rate is expected to be at or below a second predefined value for a period of time;
determine, in response to the second indication, that the amount of the exhaust gas constituent at the particular location is expected to be at or below the first predefined value for the period of time;
receive data indicative of a sensed amount of the exhaust gas constituent from the sensor of the exhaust aftertreatment system during the period of time;
determine, based on the sensed amount of the exhaust gas constituent, an amount of offset affecting the sensor of the exhaust aftertreatment system; and
initiate an action based on the determined amount of offset to diagnose the sensor, wherein the action comprises adjusting a reductant dosing based on the offset.

11. The system of claim 10, wherein the exhaust gas constituent is nitrous oxide (NOx).

12. The system of claim 10, wherein the first predefined value is approximately zero parts-per-million.

13. The system of claim 10, wherein the particular location is a system out location and wherein the exhaust gas constituent is NOx.

14. The system of claim 10, wherein the sensor is a system-out NOx sensor.

15. The system of claim 10, wherein in determining that the amount of the exhaust gas constituent at the particular location is expected to be at or below the first predefined value for the period of time, the processor is configured to:
receive data indicative of an inlet temperature for a selective catalytic reduction (SCR) of the exhaust aftertreatment system and of an outlet temperature for the SCR;
determine a frontside temperature and a backside temperature for the SCR based on the inlet temperature and the outlet temperature;
compare each of the frontside temperature and the backside temperature to a first threshold and second threshold; and
responsive to a determination that both the frontside temperature and the backside temperature are greater than the first threshold and less than the second threshold, determine that the amount of the exhaust gas constituent is expected to be at or below the first predefined value.

16. The system of claim 10, wherein the executable instructions when executed by the processor further cause the processor to:
determine that an enabling condition is satisfied prior to determining that the amount of the exhaust gas constituent is expected to be at or below the first predefined value or that the exhaust gas constituent mass flow rate is expected to be at or below the second predefined value.

17. The system of claim 10, wherein responsive to the determined amount of offset exceeding a predefined high threshold, the action comprises setting a fault indicator for the first indication or the second indication, the fault indicator regarding the sensor.

18. The system of claim 17, wherein responsive to the determined amount of offset being less than a predefined low threshold, the action comprises setting a fault indicator for the first indication or the second indication, the fault indicator regarding the sensor, and wherein responsive to the determined amount of offset falling between the predefined low and high thresholds, the fault indicator for the first indication or the second indication is bypassed.

19. A non-transitory computer-readable medium comprising executable instructions that, when executed by a processor, cause the processor to:
receive a first indication of active exhaust gas flow from an engine to the exhaust aftertreatment system or a second indication of no or low active exhaust gas flow to the exhaust aftertreatment system;
determine, in response to the first indication, that an amount of an exhaust gas constituent at a particular location is expected to be at or below a first predefined value or that an exhaust gas constituent mass flow rate is expected to be at or below a second predefined value for a period of time;
determine, in response to the second indication, that the amount of the exhaust gas constituent at the particular location is expected to be at or below the first predefined value for the period of time;
receive data indicative of a sensed amount of the exhaust gas constituent from a sensor of the exhaust aftertreatment system during the period of time;
determine, based on the sensed amount of the exhaust gas constituent, an amount of offset affecting the sensor of the exhaust aftertreatment system; and
initiate an action based on the determined amount of offset to diagnose the sensor, wherein the action comprises adjusting a reductant dosing based on the offset.

20. The non-transitory computer-readable medium of claim 19, wherein in determining that the amount of the exhaust gas constituent at the particular location is expected to be at or below the first predefined value for the period of time, the executable instructions when executed cause the processor to:
receive data indicative of an inlet temperature for a selective catalytic reduction (SCR) of the exhaust aftertreatment system and of an outlet temperature for the SCR;
determine a frontside temperature and a backside temperature for the SCR based on the inlet temperature and the outlet temperature;
compare each of the frontside temperature and the backside temperature to a first threshold and a second threshold; and
responsive to a determination that both the frontside temperature and the backside temperature are greater than the first threshold and less than the second threshold, determine that the amount of the exhaust gas constituent is expected to be at or below the first predefined value.

* * * * *